Patented May 8, 1934

1,957,465

UNITED STATES PATENT OFFICE 1,957,465

TREATMENT OF MAPLE SIRUP

Albert Adams Lund, Port Washington, and Robert Stephen Anthony, New York, N. Y., assignors to Les Producteurs de Sucre d'Erable de Quebec, Levis, Quebec, Canada, a corporation of Canada No Drawing. Application September 2, 1932, Serial No. 631,580

4 Claims. (Cl. 99—11)

This invention relates to improvements in maple products and refers more particularly to true maple flavoring products and the production of maple sugar.

It is well known that in preparing maple flavored ice creams, confections and like products, which contain a critical ratio of sugars to water, there is grave danger in adding ordinary maple sirup or maple sugar as the flavor constituent, in that the additional sugar which is contained in the maple product will cause an unbalancing of the formula and will result in the precipitation of sugars with attendant graininess.

Particularly is this true in the manufacture of ice creams wherein it is the commercial practice to standardize upon a single basic mix for reasons of uniformity and economy. Of the variety of flavors added to this basic mix, maple is the only flavor which heretofore has contained any very substantial portion of sugar. Consequently, in adding maple sirup or sugar to the basic mix to impart a maple flavor thereto, it has been necessary to add a large proportion of additional sugar, thus unbalancing the mixture and, in addition to making the product excessively sweet, depressing the freezing point of the mixture which then requires additional energy and cost to freeze and maintain in a solid state and results in a lowering of the solubility of the milk sugar to the point where it is forced to crystallize out and impart an objectionable sandy texture to the ice cream.

None of the so-called concentrated maple sirups heretofore produced are concentrates in fact, but are merely blends of dark maple sirups and maple caramel with or without added maple extract. No sugar is removed in the preparation of these sirups and practically the same amount is required as a flavoring material as would be required if a straight unblended maple sirup of dark color were used. Moreover, it is well known in the art that the addition of caramel imparts a characteristic sorghum flavor to the product and that the use of maple extract as a fortifier for such sirups produces a medicinal aftertaste.

It is further well known that the violent chemical treatment of the barium process for extracting maple flavor destroys the more delicate portions of the flavor with the result that maple extracts so produced are lacking in fidelity of aroma to true maple, are costly to produce, and possess the objectionable medicinal character referred to above.

In producing the so-called "granulated" or "stirred" maple sugars having the desirable mild flavor and light color characteristics from whole sirup under prior processes, this sirup must be very low in invert content, for example, not over 2%, or a satisfactory product cannot be obtained. The individual grains or particles of such sugars, as heretofore prepared, are in reality crystal or fondant aggregates consisting of many smaller grains or crystals caused to adhere firmly together by the comparatively large amounts of sirup entrained as thin films upon their external surfaces. Sugars comprising such aggregates lack the brilliancy and general attractiveness of sugars comprising individual crystals of larger size, and are moreover exceedingly susceptible to lumping. Our improved process provides for producing sugars of the same desirable light color and mild flavor but which consist of separate crystals of larger size and hence greater attractiveness and lessened tendency to lump, from cheaper sirups of darker color and/or higher invert content. By using such sirups, which are initially stronger in flavor and producing sugars of larger grain size and hence greatly diminished surface area, we are enabled to recover a substantial quantity of maple molasses or liquid flavoring concentrate and still leave on the crystals a sufficient film to impart the desirable flavor character to the granulated sugar.

It is an object of our invention to produce a true maple flavoring material and maple sugar by purely mechanical means and without the use of chemical reagents.

Another object of our invention is to provide a simple and inexpensive process of producing a pure maple flavoring concentrate which is highly efficient in use and which encompasses the difficulties attending the use of prior products as set forth above.

It is a further object of our invention to provide an efficient and economical process for preparing improved types of granulated maple sugars.

A further object of our invention is to utilize sirups of relatively high invert content and/or dark color which have a cheap market value and produce therefrom products of the highest quality.

Our process consists substantially in producing such products by atmospheric evaporation and spontaneous crystallization under controlled conditions of density and invert content, hydrogen ion concentration, temperature and time.

More specifically, our process is as follows:

We cook a 65-69° Brix normal maple sugar sirup or maple sap sirup under atmospheric pressure to approximately 80° Brix. We allow this to crystallize spontaneously, without seeding, without agitation, and without artificial cooling. The crystallization is preferably delayed so that it will not be completed for at least 24 hours, thus promoting the growth of large crystals which will be easy to separate and which will entrain a minimum of the flavor sirup due to the reduced surface area of the crystals. By thus retaining a minimum amount of molasses on the crystals during the spinning operation, we avoid the necessity for recovering flavor material from the spun sugar by washing, inasmuch as concentration of this wash water involves an excessive amount of cooking with resulting caramelization and alteration of flavor. We have found that attempts to accelerate crystallization result in microscopic crystal deposits and that these deposits cannot be readily removed by subsequent centrifuging. We therefore conduct the crystallizations during normal cooling and not in the evaporator while hot. Care must be taken to avoid artificial acceleration of crystallization due to accidental seeding or other causes, as for example, by covering the crystallizing tanks with damp cloths, insulating the tanks against vibration, maintaining regulated storage room humidities, tank temperatures, and the like. We centrifuge off the first crop of crystals preferably in a basket centrifuge. We then recook the molasses to 80° Brix, crystallize in the same manner as before and centrifuge off the second crop of crystals. Each crystallization normally requires 48–72 hours according to the storage temperature, retained heat due to the size of the batch, and the like. Two crystallizations are ordinarily sufficient to produce a sirup of required flavoring strength, although with sirups running high in invert, a third crystallization may be necessary.

We prefer to evaporate to 80° Brix because at higher densities the magmas become excessively thick and the massecuites prone to fine crystal deposits which are difficult if not impossible to successfully centrifuge. At lower densities, the proportion of sugar recovered is less per operation and the cost of concentrating proportionately increased.

In our earlier efforts to produce a satisfactory maple concentrate we employed vacuum boiling as practiced in standard sugar refining processes. We were obliged to abandon this method of evaporating when we discovered that under conditions of reduced pressure a substantial proportion of the flavor of the maple sirup passed over into the distillate (from which it could only be recovered at considerable expense and with great difficulty) and resulted in a corresponding impoverishment of the flavoring strength of the boiled magma.

Our invention is predicated in part upon this discovery and upon the fact that large crystals present a minimum of surface area for the entrainment of the flavor-bearing sirup films.

Our final sirup product possesses approximately 2½ to 4 times the flavoring strength of normal maple sap sirup. The amount required to adequately flavor ice cream, confections or the like is 25% to 40% of the quantity of sirup normally required. The sugar addition to the mix is reduced by 60% to 75%, the reduced proportion incorporated being insufficient to seriously alter the composition and keeping properties of the flavored product.

Sirups of relatively high invert content may be used, for example 4 to 10% based on total weight of sirup or 6 to 15% based on total weight of dry sugar. Although generally we have found that the yield decreases as the invert content is increased, we prefer to use sirups dark in color and higher in invert than would normally be acceptable for fancy table use as these sirups are ordinarily strongest in flavor and lower in cost.

We prefer also the use of sirups of approximately pH 6.0 to 6.5. Where the acidity is greater it may be necessary to buffer to prevent excessive inversion during cooking. Care must be taken however, to avoid getting the sirup too alkaline so as to prevent excessive caramelization and alteration of the flavoring character.

Our invention is not to be confused with the standard sugar refining practice wherein the object is to remove the flavor. Conversely, our invention has for its object the conservation of all the flavor and the crystallizations, unlike those in sugar refining, are conducted directly from the concentrated crude sirup, without preliminary defecation, filtration or other processing.

While, as stated above, we prefer to use sirups of high invert content, it is understood that our invention is not intended to be limited to the use of sirups of any specific invert content and, if found desirable, blends of both the liquid and sugar products of various different sirups may be made without departing from the scope of our invention.

Concentrated maple flavoring derived from our improved process is not intended to be confined to particular uses herein stated for exemplification, but is applicable for any purpose where maple sirup or maple flavoring may be desired, such as in tobacco treating, confection making, baking, beverage preparation and the like.

It is understood that various minor changes in the process which comprises our invention may be made without departing from the concept thereof.

We claim:

1. A process for recovering maple products from maple sirup which comprises concentrating the sirup at a pressure of at least atmospheric, allowing it to crystallize substantially spontaneously, recovering the remaining liquid as a flavor bearing material and recovering the crystals as maple flavored sugar.

2. A process for recovering maple products from maple sirup of relatively high invert content which comprises concentrating the sirup at a pressure of at least atmospheric to approximately 80° Brix, allowing the concentrated sirup to crystallize substantially spontaneously and separating the crystals from the sirup, again concentrating the remaining sirup at a pressure of at least atmospheric to approximately 80° Brix, allowing the twice concentrated sirup to crystallize substantially spontaneously and separating the crystals from the sirup, recovering the remaining sirup as a maple flavor bearing material and recovering the crystals as maple flavored sugar.

3. A process for producing concentrated maple flavoring material which has a flavoring strength at least equal to the ratio of concentration of the maple sap sirup which comprises concentrating maple sap sirup at a pressure of at least atmospheric, allowing it to crystallize substantially spontaneously, separating the crystals, and recovering the remaining liquid as concentrated maple flavoring material.

4. A process for recovering maple products from maple sirup which comprises concentrating the sirup while suppressing volatilization, permitting the growth of relatively large crystals whereby a minimum quantity of sirup is entrained thereon when the crystals are separated from the sirup, separating the crystals from the sirup, recovering the remaining sirup as a maple flavor bearing material and recovering the crystals as maple flavored sugar.

ALBERT ADAMS LUND.
ROBERT STEPHEN ANTHONY.